June 14, 1960 W. HONOLKA 2,941,035

APPARATUS FOR SIGNAL TRANSMISSION AND RECEPTION

Filed July 23, 1956 2 Sheets-Sheet 1

INVENTOR.
Walter Honolka

BY
Michael S. Striker
Attorney

APPARATUS FOR SIGNAL TRANSMISSION AND RECEPTION

Filed July 23, 1956 2 Sheets-Sheet 2

INVENTOR.
Walter Honolka

BY Michael S. Striker
Attorney

United States Patent Office 2,941,035

Patented June 14, 1960

2,941,035

APPARATUS FOR SIGNAL TRANSMISSION AND RECEPTION

Walter Honolka, Stuttgart, Germany, assignor to Firma Bölkow Entwicklungen Kommanditgesellschaft of Stuttgart Filed July 23, 1956, Ser. No. 599,506

Claims priority, application Germany July 23, 1955

12 Claims. (Cl. 179—1.5)

The present invention relates to a system for the transmission and reception of information by means of electrical signals. More particularly, the present invention relates to an apparatus for coding and decoding information transmitted and received by electrical signals.

As is well known, information is transmitted by electrical signals in many different fashions. Such transmission can be carried over wireless systems or systems connected by wire. In addition, the actual sound waves containing the information can be converted into electrical signals and transmitted to remote receiving stations. In addition, telegraphic code systems are used for sending dot and dash messages rather than sending electrical signals corresponding to the sound waves directly.

Since the transmitted signals are transmitted through well-known frequency ranges, it is possible for unauthorized persons and receiving stations to pick up the electrical signals containing the transmitted information and use such information for their own purposes. Therefore, if the information to be transmitted is of importance, it can be coded before being sent and decoded at the receiving station after the message is received.

There are additional arrangements which are used for scrambling the electrical signals containing the information so that unauthorized listeners and receiving stations will not understand the electrical signals. The scrambled electrical signals may be unscrambled at the receiving stations so that the information contained in the electrical signals is readily available.

It is accordingly an object of the present invention to provide a new and improved apparatus for scrambling and unscrambling electrical signals containing information to be transmitted and received.

A second object of the present invention is to provide a new and improved apparatus for scrambling and unscrambling electrical signals which can be constructed in a relatively inexpensive manner and which occupies very little physical space.

Another object of the present invention is to provide a new and improved apparatus for scrambling electrical signals containing information to be transmitted by introducing a relative movement between a recording head and a magnetic tape which operates with the recording head.

Still another object of the present invention is to provide a new and improved apparatus for scrambling and unscrambling transmitted and received electrical signals, respectively, wherein the scrambling apparatus at the transmitting station can be precisely synchronized with the unscrambling apparatus at the receiving station.

Still a further object of the present invention is to provide a new and improved scrambling and unscrambling apparatus wherein a plurality of magnetic recording and reproducing heads are arranged in close association with each other without interfering with the particular operation carried out by the relative magnetic heads.

With the above objects in view the present invention mainly consists of an apparatus for the transmission and reception of information by means of electrical signals including a base member, a record carrier mounted on the base member and adapted to have electrical signals recorded thereon, at least one recording head mounted adjacent the record carrier for recording electrical signals thereon, at least one reproducing head mounted adjacent the record carrier for reproducing the electrical signals recorded on the record carrier, and means for moving at least one of the heads in a predetermined manner with respect to the record carrier thereby changing the electrical signals occurring at the one head in the predetermined manner.

In a preferred embodiment of the present invention the record carrier is arranged in the form of an annular magnetic tape and recording and reproducing heads are mounted within the space enclosed by the annular magnetic tape.

In another preferred embodiment of the present invention the recording head for the receiving apparatus is arranged spaced from the reproducing head of the transmitting apparatus and the spacing between these two heads may be accurately aligned so that they are respectively synchronized.

In an embodiment of the present invention the movable recording and reproducing heads which are moved with respect to the record carrier are moved by a cam means which is in the form of an endless band having an irregular edge portion serving as the cam track.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
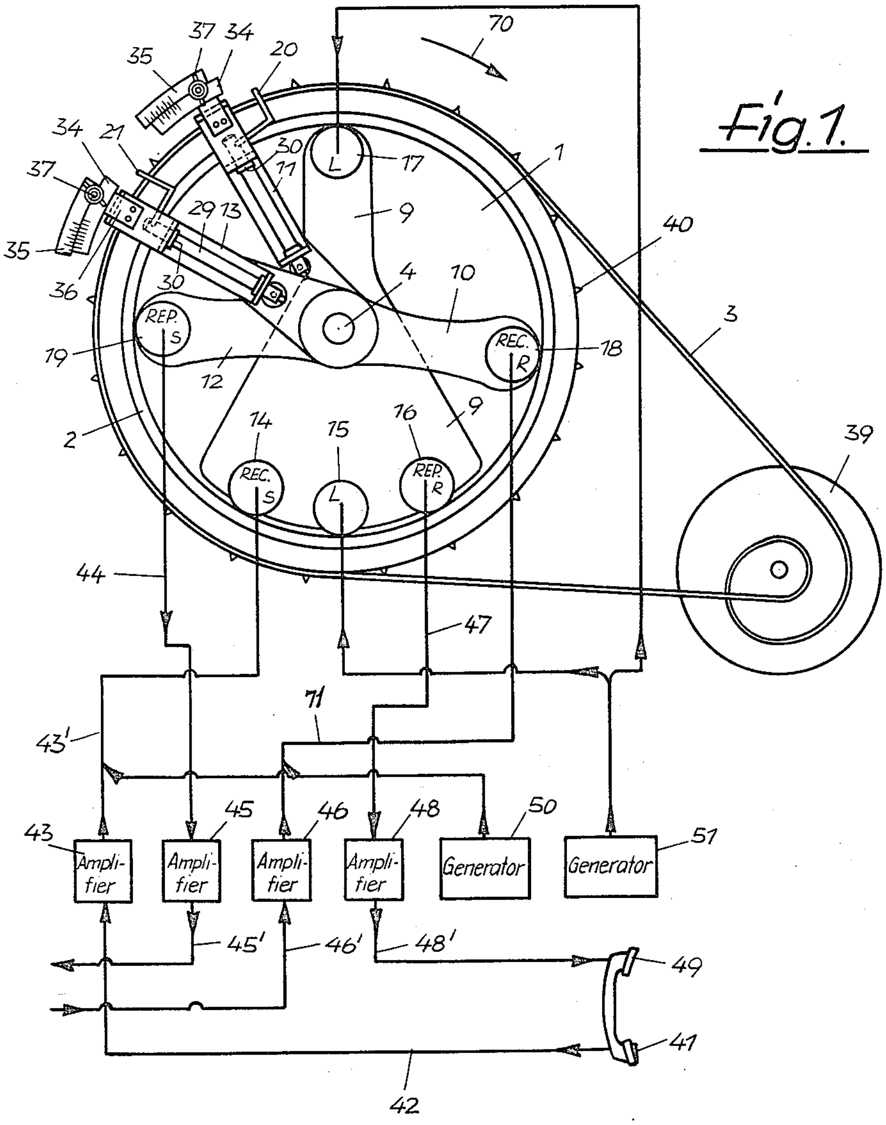
Fig. 1 is a partial plan view of one embodiment of the present invention shown in conjunction with conventional electronic apparatus in block form.
Figure 2:
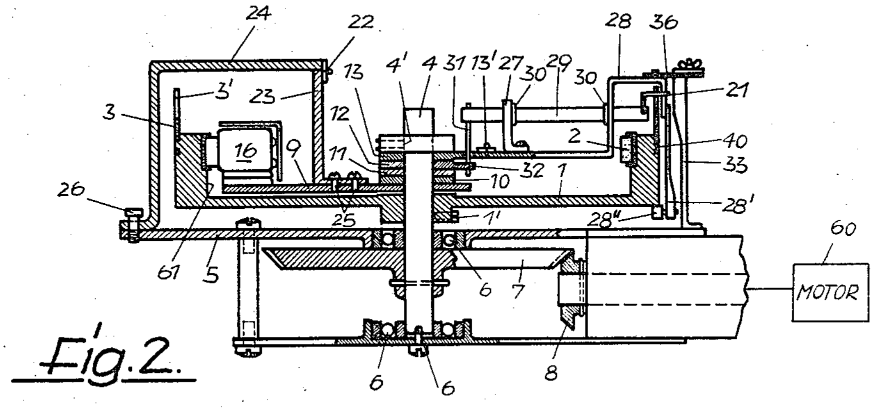
Fig. 2 is an elevational view of the embodiment shown in Fig. 1, partially in section.

Referring to the drawings and more particularly to Figs. 1 and 2 it can be seen that the entire apparatus is mounted on a stationary base member 5. Perpendicular to the bottom of the base member 5 and rotatably mounted with respect thereto is a shaft 4 which is rotatably mounted within bearings 6.

Fixedly connected to the shaft 6 by means of a pin 7' is a supporting member 1 having an inner cylindrical face 61. Mounted on the inner cylindrical face 61 is an annular record carrier 2 which may be in the form of a magnetic tape for example. The magnetic tape 2 is in the form of an endless belt fixedly mounted on the inner surface 61 of the supporting member 1.

At the lower portion of the shaft 4 is fixedly mounted a bevel gear 7 which engages a second bevel gear 8 which in turn is connected to a motor 60. The motor 60 is preferably a synchronous motor.

Figure 3:
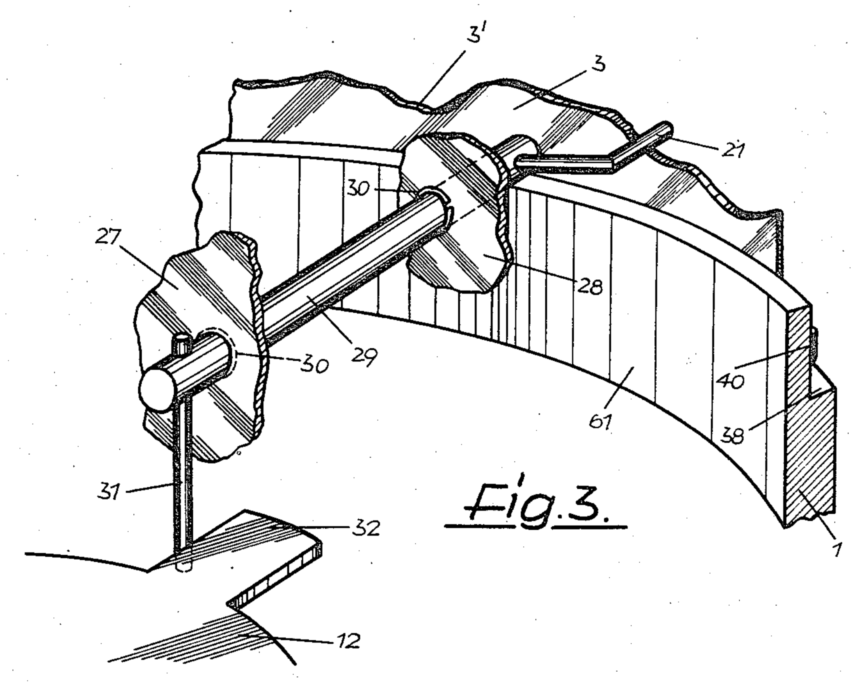
Fig. 3 is a perspective view of one of the control arrangements for controlling the movement of the recording and reproducing heads used in the embodiment illustrated in Figs. 1 and 2.

Mounted on the outer cylindrical surface of the supporting surface 1 is an endless belt 3 having a plurality of perforations which cooperate with a plurality of teeth 40 formed in the outer surface of the supporting member 1. In Figs. 1 and 3 it can be seen that the endless band 3 is moved when the supporting member 1 is rotated by the motor 60 and the gears 78.

As can best be seen in Fig. 3, the upper edge portion of the band means 3 is irregularly shaped to form a cam track 3'. The purpose of the cam track will be explained hereinbelow with respect to the operation of the apparatus. In Fig. 1 it can be seen that the endless belt 3 is arranged partially within a magazine 39 which is only schematically shown. The magazine 39 is of the type commonly used with movie cameras and movie film wherein a large plurality of turns of the film are located within the magazine which has an inlet and outlet opening to permit the film to be taken out from the magazine and fed back into the same.

Referring to Figs. 1 and 2, particularly, it can be seen that a carrying arm 9 is arranged within the space enclosed by the cylindrical inner surface 61 of the supporting member 1. The carrying arm 9 has an axial opening which cooperates with the shaft 4 but the arm 9 does not rotate with rotation of the shaft 4. Rather, the carrying arm 9 is fixedly connected to the base member 5 by means of bracket 23, hinge 22, bracket 24 and screw 26 which is threaded into the base member 5. It can be seen that by loosening the screw 26, the bracket 24 which serves as a cover can be swung back to reveal the carrying arm 9 located within the supporting member 1.

In Fig. 1 it can be seen that the carrying arm 9 has two opposite end portions, on one of which is fixedly mounted a recording head 14, an erasing head 15 and a reproducing head 16. On the opposite end of the carrying arm 9 is fixedly mounted an erasing head 17. Each of the recording, reproducing and erasing heads 14—17 respectively are conventional magnetic heads which can be used for either recording, reproducing or erasing in accordance with the particular energization thereof. These heads are arranged in operable association with the magnetic tape 2 so that the outer edge portions of the heads are adjacent the magnetic tape 2. For example, the reproducing head 16 is shown, in Fig. 2, with its outer edge portion adjacent the magnetic tape 2.

Arranged immediately above the central portion of the carrying arm 9 of the shaft 4 is a second carrying arm 10. In Fig. 1 it can be seen that the carrying arm 10 has mounted on the free end portion thereof a recording head 18 which is in operable association with the magnetic tape 2.

The carrying arm 10 has a second free end portion at the other side of the shaft 4 which is adapted to cooperate with a cam control member to pivot the carrying arm 10 in a manner to be described hereinbelow.

Arranged directly above the carrying arm 10 is a carrying arm 11 which mounts a control member for the carrying arm 10 and includes a cam follower 20 at one end thereof.

Above the carrying arm 11 is another carrying arm 12 which extends in a direction substantially opposite to the direction of the carrying arm 10. In Fig. 1, it can be seen that the carrying arm 12 has fixedly mounted thereon a reproducing head 19 which is in operable association with the magnetic tape 2. The carrying arm 12 is provided with a projection 32, best seen in Figs. 2 and 3 which is adapted to cooperate with a pin 31 of a cam control member in a manner to be explained hereinbelow.

Directly above the carrying arm 12 is a carrying arm 13 which is similar to the carrying arm 11 and includes a control member 29 connected to a cam follower 21 for cooperating with the carrying arm 12.

Connected above the carrying arm 13 to the shaft 4 is a disk 4' which maintains the carrying arms 9—13 in close relationship to prevent axial movement thereof.

The purpose of the apparatus shown in Figs. 1, 2 and 3 is to scramble electrical signals to be transmitted and to unscramble electrical signals received. The signals to be transmitted are scrambled by moving the reproducing head 19 with respect to the magnetic tape 2 in a predetermined manner to modulate the electrical signals reproduced by the head 19.

Similarly, the received signals are unscrambled by moving the recording head 18 with respect to the magnetic tape 2 in a predetermined manner which is synchronized with the manner in which the transmitted signals had previously been modulated so as to demodulate the signals when they are recorded on the magnetic tape 2. Therefore, the purpose of the cam means 3 is to move the recording head 18 and the reproducing head 19 in a predetermined manner controlled by the cam track of the cam means.

Therefore, the present apparatus operates in the following manner. Referring to Figs. 1 and 2, the motor 60 is running to move the magnetic tape past the heads 14–19. When the apparatus is used for transmitting purposes, the sound waves containing the information to be transmitted are picked up by the microphone 41.

In the microphone 41 the sound waves are converted to electrical signals and conducted by the conductor 42 to an amplifier 43. The amplified signals leaving the amplifier 43 are transmitted on conductor 43' to the recording head 14. This stationary recording head 14 thereby accurately records the electrical signals on the magnetic tape 2 which is rotating in a clockwise direction in accordance with the arrow 70 of Fig. 1.

After the signal is recorded on magnetic tape 2 it passes by the reproducing head 19 and the electrical signals are reproduced thereby. However, in a manner to be explained hereinbelow, the reproducing head 19 is moved in a predetermined manner depending on the cam track 3' of the cam 3 so that the electrical signals actually reproduced by the reproducing head 19 are modulated in accordance with this predetermined manner.

The reproduced signals are transmitted from the reproducing head 19 on the conductor 44 to the output amplifier 45 and from there transmitted to a transmitter or transmitting antenna by the conductor 45. The function of the apparatus as a transmitter ceases herewith and the transmitted signals are picked up at a remote receiving station which may be connected by wires or which may be arranged in a wireless operating manner.

In the receiving station the electrical signals which have been scrambled due to the modulation introduced by the reproducing head 19 must be demodulated in order to render the information contained in the electrical signals intelligible. When information is transmitted back from the remote receiving station to the apparatus shown in Figs. 1 and 2 the electrical signals arrive on the conductor 46' and have been modulated or scrambled in the manner hereinabove described. Therefore these electrical signals are amplified by the amplifier 46 and applied on the conductor 71 to the recording head 18. The recording head 18 which is moved in a predetermined manner by the cam 3 as will be described hereinbelow, records the electrical signals on the magnetic tape which is moving in the clockwise direction of the arrow 70. It should be noted at this point that the magnetic tape no longer has any electrical signals thereon before it reaches the recording head 18 since it has already passed by the erasing head 17 and has become cleared of any previous magnetization.

Since the recording head 18 is moved in a predetermined manner which is synchronized with the manner in which the reproducing head of the transmitting station had been moved, the signals recorded on the magnetic tape 2 are now demodulated and rendered completely intelligible.

These signals, recorded on the magnetic tape 2 now pass by the reproducing head 16 which is stationary and are converted back into electrical signals transmitted on conductor 47 and amplified in amplifier 48 from which they are conducted on conductor 48' to the speaker 49. At the speaker 49 they are converted back into the sound waves containing the information which had been transmitted from the transmitting station.

Referring now to Fig. 3, the apparatus by which the recording head 18 and the reproducing head 19 is moved in a predetermined manner will be explained. Actually, only the carrying arm 12 and portions of arm 13 are indicated in Fig. 3 but it will be apparent that the carrying arms 10 and 11 are arranged in a similar manner.

In Fig. 3 it can be seen that the supporting member 1 is provided with a flange 38 adapted to receive the underside portion of the cam belt or endless band 3. As indicated hereinabove the cam belt 3 is provided with holes cooperating with the sprockets 40 on the outer surface of the supporting member 1. Therefore, as the supporting member 1 is rotated by the shaft 4, the cam belt 3 is rotated therewith through the interaction of the sprockets 40 and the holes in the cam belt 3.

In Fig. 2 it can be seen that the carrying arm 13 has connected thereto a bracket 27 and has an end portion 28 which extends in an axial direction parallel to the shaft 4. Pivotally mounted between the bracket 27 and the end portion 28 on the carrying arm 13 is a control member 29 which is maintained in proper position by the rings 30.

At the free end portion of the control member 29 closer to the shaft 4, the member 29 is provided with a pin 31 which extends downwardly through a hole in the carrying arm 13 into engagement with the projection 32 on the carrying arm 12.

At the other end of the control member 29 is provided a cam follower 21 which is in engagement with the cam track 3' of the cam 3. By an unillustrated spring means, the carrying arms 12 and 13 are urged in such manner that the projection 32 bears up against the pin 31 and tends to urge the cam follower 21 into normal engagement with the cam track 3' of the cam 3. The spring pressure is so arranged that the cam follower 21 is gently urged with its lowest point into engagement with the cam track portion 3'.

As the supporting member 1 rotates and the endless cam belt 3 moves therewith the cam follower 21 is moved upwardly and downwardly in accordance with the irregular cam track 3' on the cam 3. The up and down movement of the cam follower 21 pivots the control member 29 in accordance therewith. This also pivots the pin 31 which is fixedly mounted in the control member 29. Therefore the projection 32 is moved back and forth in a predetermined pattern depending on the irregular pattern contained in the cam track 3'.

Since the carrying arm 12 has mounted thereon the reproducing head 19, it is clear that the reproducing head 19 is moved back and forth in precisely the same manner as the pin 31 which is controlled by the cam follower 21. Therefore, by properly preparing the predetermined cam track 3', it is possible to provide a predetermined irregular movement for the reproducing head 19, which irregular movement will modulate the electrical signals being reproduced by the reproducing head 19. It is clear that the cam track 3' can be arranged in any desired manner which would be impossible for an unauthorized person to duplicate due to the vast irregularities thereof.

Since it is possible for the supporting member 1 to be axially displaced with respect to the base member 5 by mechanical vibrations and the like it is advantageous to connect the carrying arms 13 and 11 to the supporting member 1 so that if the supporting member 1 is moved in axial direction, the carrying arms 11 and 13 will move in the same direction so as not to provide undesired fluctuations on the cam follower 21.

For this purpose, in Fig. 2, is shown a leaf spring 28' mounted on the end of the end portion 28 of the carrying arm 13. At the lower end of the leaf spring 28' is provided a roller 28'' which is urged into contact with the supporting member 1 by the leaf spring 28'. Therefore as the supporting member 1 rotates, the roller 28'' rotates therewith. If the supporting member 1 tends to move in an axial direction, the roller 28'' will be deflected in the same direction and carry with it the carrying arm 13. It is clear that a similar arrangement is provided for the carrying arm 11 to provide similar compensation.

To provide accurate adjustment of the carrying arms and accurate spacing between the carrying arms 11 and 13, further indicating means are provided. In Fig. 2, it can be seen that a leaf spring 36 is connected to the upper surface of the end portion 28. This leaf spring 36 has an upper face which is provided with a vernier scale 34 thereon, and a wing nut and screw arrangement 37. The wing nut and screw arrangement cooperates with an angular scale 35 provided on the upper end of a bracket 33 which is fixedly connected to the base member 5 as seen in Fig. 2.

Therefore, by loosening the wing nut 37 it is possible to adjust the exact position of the carrying arms 11 and 13 with respect to the base member 5 as determined by the vernier scale arrangements. That is, the arms 11 and 13 may be shifted in a circumferential direction when desired.

The purpose of this adjustment is to compensate for the time delay between the transmission of a signal from a transmitting station and the receipt of this signal at the receiving station. It is for this reason that the cam followers 20 and 21 are spaced from each other so that the cam follower 21 which is used for controlling the reproducing head 19 for transmitting purposes is arranged ahead of the cam follower 20 which controls the recording head 18 used for receiving purposes.

The reproducing heads 19 in all the different transmitting stations are arranged in the same manner so that when a signal is modulated by a reproducing head in a remote transmitting station, for example, when it is received at the recording head 18, the cam track portion which had been in contact with the cam follower 21 in the remote transmitting station is now in contact with the cam follower 20 in the receiving station. Therefore the cam follower 20 now moves the recording head 18 in precisely the same manner as the reproducing head 19 in the transmitting station had been moved when the electrical signals were modulated. This provides the accurate demodulation and synchronization in the receiving stations. It is clear that when the receiving station receives the transmitted electrical signals the carrier arm 11 may be precisely adjusted to give accurate roproduction from the recording head 18.

Because of the endless belt arrangement of the cam track, it is clear that the cam may be continuously used to transmit messages over long periods. However, when desired, the endless belt can easily be replaced to provide a new scrambling system in accordance with a new irregular pattern.

From the above it is therefore clear that the transmitting station scrambles the information to be transmitted by modulating these signals with a movable reproducing head. These signals are unscrambled in the receiving station by demodulating the received signals with a movable recording head which is moved in precisely the same manner as the previous reproducing head had been in the transmitting station. By properly spacing the cam followers for the respective recording and reproducing heads it is possible to compensate for the time delay due to the transmission between remote stations.

Although the apparatus has been illustrated only for the carrying arms 12 and 13 as far as the cam control means is concerned, it is clear that a similar arrangement is provided for the carrying arms 10 and 11 respectively.

It should be noted that after a received message is reproduced by the reproducing head 16, the magnetization of the magnetic tape is erased by the erasing head 15 which leaves the tape available for the recording head 14 in the event that signals are desired to be transmitted thereby.

In Fig. 1, generators 50 and 51 are schematically shown. The generator 50 provides the proper energization for the magnetization by the recording heads 14 and 18 and the generator 51 provides the proper energization for the operation of the erasing heads 15 and 17.

It will be understood that each of the elements described above, or two or more together, may also find a useful application in other types of transmitting and receiving apparatus differing from the types described above.

While the invention has been illustrated and described as embodied in apparatus for the transmission and reception of information by means of electrical signals and including apparatus for scrambling and unscrambling such signals, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an apparatus for the transmission and reception of information by means of electrical signals in combination, a base member; a record carrier mounted on said base member and adapted to have electrical signals recorded thereon; at least one recording head and one associated reproducing head mounted adjacent said record carrier for recording electrical signals thereon and for reproducing, respectively, the electrical signals recorded on said record carrier; cam means movably mounted on said base member and having a cam track arranged in a predetermined manner; a cam follower movably mounted on said base member and being urged into contact with said cam track of said cam means; means for moving said cam means with respect to said base member so that said cam follower is moved by said cam track in said predetermined manner; and a control member movably mounted on said base member and connected to said cam follower so as to be moved by the same, said control member also engaging at least one of said heads at the other end thereof whereby said one head is moved by said control member in said predetermined manner with respect to the associated head thereby changing the electrical signals occurring at said one head in said predetermined manner as said cam means is moved with respect to said base member.

2. In an apparatus for the transmission and reception of information by means of electrical signals, in combination, a base member a record carrier mounted on said base member at a substantially constant speed and adapted to have electrical signals recorded thereon and reproduced therefrom; a first support member fixedly mounted on said base member; a first recording head fixedly mounted on said first support member and adapted to record electrical signals on said record carrier; a first reproducing head fixedly mounted on said first support member spaced from said first recording head and adapted to reproduce electrical signals from said record carrier; a second support member movably mounted on said base member; a second recording head fixedly mounted on said second support member and movable therewith, said second recording head being adapted to record electrical signals on said record carrier; a third support member movably mounted on said base member; a second reproducing head fixedly mounted on said third support member and movable therewith, said second reproducing head being adapted to reproduce electrical signals from said record carrier; and means for moving said second and third support members during recording and reproducing, respectively, in a predetermined manner so that said second recording and reproducing heads are moved with respect to said record carrier in said predetermined manner at varying positive and negative velocities relative to the constant speed of said record carrier so as to change the electrical signals occurring at said second recording and reproducing heads in said predetermined manner.

3. In an apparatus for the transmission and reception of information by means of electrical signals, in combination, a base member a record carrier mounted on said base member at a substantially constant speed and adapted to have electrical signals recorded thereon and reproduced therefrom; a first support member fixedly mounted on said base member; a first recording head fixedly mounted on said first support member and adapted to record electrical signals on said record carrier; a first reproducing head fixedly mounted on said first support member spaced from said first recording head and adapted to reproduce electrical signals from said record carrier; an erasing head fixedly mounted on said first support member between said first recording and reproducing heads and being adapted to erase electrical signals recorded on said record carrier whenever desired; a second support member movably mounted on said base member; a second recording head fixedly mounted on said second support member and movable therewith, said second recording head being adapted to record electrical signals on said record carrier; and means for moving said second support member in a predetermined manner so that said second recording head is moved with respect to said record carrier in said predetermined manner at varying positive and negative velocities relative to the constant speed of said record carrier so as to change the electrical signals recorded by said second recording head in said predetermined manner.

4. In an apparatus for the transmission and reception of information by means of electrical signals, in combination, a base member a record carrier mounted on said base member at a substantially constant speed and adapted to have electrical signals recorded thereon; a first support member pivotally mounted on said base member; at least one recording means fixedly mounted on said support member and pivotable therewith, said recording means being adapted to cooperate with said movable record carrier for recording electrical signals thereon; a second support member pivotally mounted on said base member; at least one reproducing means fixedly mounted on said support member and pivotable therewith, said reproducing means being adapted to cooperate with said movable record carrier for reproducing electrical signals therefrom; cam means movably mounted on said base member and having a cam track arranged in a predetermined manner; first and second spaced cam followers movably mounted on said base member and being urged into contact with said cam track of said cam means; means for moving said cam means with respect to said base member so that said spaced cam followers are moved by said cam track in said predetermined manner depending on the particular cam track portion with which said respective cam followers are in contact; a first control member pivotally mounted on said base member and connected to said first cam follower so as to be pivoted by the same, said first control member also engaging said first support member so as to pivot the same and said recording means in said predetermined manner when said first cam follower is moved by said cam means; and a second control member pivotally mounted on said base member and connected to said second cam follower so as to be pivoted by the same, said second control member also engaging said second support member so as to pivot the same and said reproducing means in said predetermined manner when said second cam follower is moved by said cam means whereby said electrical signals occurring at said recording and reproducing means are varied in said predetermined manner when said cam means is moved with respect to said base member.

5. In an apparatus for the transmission and reception of information by means of electrical signals, in combination, base means; a supporting member having a cylindrical face; an annular record carrier mounted on said cylindrical face of said supporting member and adapted to be moved at a substantially constant speed and to have electrical signals recorded thereon and reproduced therefrom; a reproducing and recording member mounted on said base means and including spaced reproducing and recording heads, respectively, said recording head being adapted to record electrical signals on said record carrier and said reproducing head being adapted to reproduce electrical signals from said record carrier; means for moving said supporting member and said reproducing and recording member with respect to one another for recording electrical signals on said record carrier and reproducing electrical signals therefrom; and means for moving one of said heads in a predetermined manner with respect to said record carrier at varying positive and negative velocities relative to the constant speed of said record carrier so as thereby to modulate the signals occurring at said one head in said predetermined manner.

6. In an apparatus for the transmission and reception of information by means of electrical signals, in combination, base means; a supporting member having an inner cylindrical face and enclosing a space of said supporting member; an annular record carrier mounted on said inner cylindrical face of said supporting member and adapted to be moved at a substantially constant speed and to have electrical signals recorded thereon and reproduced therefrom; a reproducing and recording member mounted on said base means within said space of said supporting member and including spaced reproducing and recording heads, respectively, said recording head being adapted to record electrical signals on said record carrier and said reproducing head being adapted to reproduce electrical signals from said record carrier; means for moving one of said members with respect to the other for recording electrical signals on said record carrier and reproducing electrical signals therefrom; and means for moving one of said heads during reproducing and recording, respectively, in a predetermined manner with respect to said record carrier at varying positive and negative velocities relative to the constant speed of said record carrier so as thereby to modulate the signals occurring at said one head in said predetermined manner.

7. In an apparatus for the transmission and reception of information by means of electrical signals, in combination, a base member; a supporting member rotatably mounted on said base member and having a cylindrical face; an annular magnetic tape mounted on said cylindrical face of said supporting member and adapted to have electrical signals recorded thereon and reproduced therefrom; means for rotating said supporting member about its axis at a substantially constant speed; a first carrying arm fixedly mounted on said base member and having spaced end portions; a first recording head fixedly mounted on one end portion of said first carrying arm and arranged adjacent said magnetic tape for recording electrical signals thereon; a first reproducing head fixedly mounted on said one end portion of said first carrying arm and spaced from said first recording arm, said first reproducing head being arranged adjacent said magnetic tape for reproducing electrical signals therefrom; a first erasing head fixedly mounted on said one end portion of said first carrying arm between said first recording and reproducing heads for erasing recorded signals from said magnetic tape whenever desired; a second erasing head fixedly mounted on said other end portion of said first carrying arm for erasing recorded signals from said magnetic tape whenever desired; a second carrying arm pivotally mounted on said base member and having a free end portion; a second recording head fixedly mounted on said second carrying member and pivotable therewith, said second recording head being adapted to record electrical signals on said magnetic tape whenever desired and being positioned between said first reproducing head and said second erasing head; and means for pivoting said second carrying arm during recording in a predetermined manner to move said second recording head with respect to said magnetic tape at varying positive and negative velocities relative to the constant speed of said record carrier so as thereby to modulate the electrical signals recorded by said second recording head on said magnetic tape.

8. In an apparatus for the transmission and reception of information by means of electrical signals, in combination, a base member; a supporting member rotatably mounted on said base member and having a cylindrical face; an annular magnetic tape mounted on said cylindrical face of said supporting member and adapted to have electrical signals recorded thereon and reproduced therefrom; means for rotating said supporting member about its axis at a substantially constant speed; a first carrying arm fixedly mounted on said base member and having spaced end portions; a first recording head fixedly mounted on one end portion of said first carrying arm and arranged adjacent said magnetic tape for recording electrical signals thereon; a first reproducing head fixedly mounted on said one end portion of said first carrying arm and spaced from said first recording arm, said first reproducing head being arranged adjacent said magnetic tape for reproducing electrical signals therefrom; a first erasing head fixedly mounted on said one end portion of said first carrying arm between said first recording and reproducing heads for erasing recorded signals from said magnetic tape whenever desired; a second erasing head fixedly mounted on said other end portion of said first carrying arm for erasing recorded signals from said magnetic tape whenever desired; a second carrying arm pivotally mounted on said base member and having a free end portion; a second reproducing head fixedly mounted on said second carrying member and pivotable therewith, said second reproducing head being adapted to reproduce electrical signals from said magnetic tape whenever desired and being positioned between said first recording head and said second erasing head; and means for pivoting said second carrying arm during reproducing in a predetermined manner to move said second reproducing head with respect to said magnetic tape at varying positive and negative velocities relative to the constant speed of said record carrier so as thereby to modulate the electrical signals reproduced by said second reproducing head on said magnetic tape.

9. In an apparatus for the transmission and reception of information by means of electrical signals, in combination, a base member; a supporting member rotatably mounted on said base member and having a cylindrical face; an annular magnetic tape mounted on said cylindrical face of said supporting member and adapted to have electrical signals recorded thereon and reproduced therefrom; means for rotating said supporting member about its axis at a substantially constant speed; a first carrying arm fixedly mounted on said base member and having spaced end portions; a first recording head fixedly mounted on one end portion of said first carrying arm and arranged adjacent said magnetic tape for recording electrical signals thereon; a first reproducing head fixedly mounted on said one end portion of said first carrying arm and spaced from said first recording arm, said first reproducing head being arranged adjacent said magnetic tape for reproducing electrical signals therefrom; a first erasing head fixedly mounted on said one end portion of said first carrying arm during reproducing between said first recording and reproducing heads for erasing recorded signals from said magnetic tape whenever desired; a second erasing head fixedly mounted on said other end portion of said first carrying arm for erasing recorded signals from said magnetic tape whenever desired; a second carrying arm pivotally mounted on said base member and having a free end portion; a second reproducing head fixedly mounted on said second carrying member and pivotable therewith, said second reproducing head being adapted to reproduce electrical signals from said magnetic tape whenever desired and being positioned between said first recording head and said second erasing head; a third carrying arm pivotally mounted on said base member and having a free end portion; a second reproducing means fixedly mounted on said third carrying member and pivotable therewith, said second reproducing head being adapted to reproduce electrical signals from said magnetic tape whenever desired and being positioned between said first recording head and said second erasing head; and means for pivoting said second and third carrying arms during reproducing in a predetermined manner to move said second recording and reproducing heads with respect to said magnetic tape at varying positive and negative velocities relative to the constant speed of said record carrier so as thereby to modulate the electrical signals occurring at said heads in said predetermined manner.

10. In an apparatus for the transmission and reception of information by means of electrical signals, in combination, a base member; a record carrier mounted on said base member at a substantially constant speed and adapted to have electrical signals recorded thereon and reproduced therefrom; a first support member fixedly mounted on said base member; a first recording head fixedly mounted on said first support member and adapted to record electrical signals on said record carrier; a first reproducing head fixedly mounted on said first support member spaced from said first recording head and adapted to reproduce electrical signals from said record carrier; a second support member movably mounted on said base member; a second recording head fixedly mounted on said second support member and movable therewith, said second recording head being adapted to record electrical signals on said record carrier; a third support member movably mounted on said base member; a second reproducing head fixedly mounted on said thrid support member and movable therewith, said second reproducing head being adapted to reproduce electrical signals from said record carrier; and means for moving said second and third support members during recording and reproducing, respectively, in a predetermined manner so that said second recording and reproducing heads are moved with respect to said record carrier in said predetermined manner at varying positive and negative velocities relative to the constant speed of said record carrier so as to change the electrical signals occurring at said second recording and reproducing heads in said predetermined manner; and means for adjusting the relative positions between said second recording head and said second reproducing head.

11. In an apparatus for the transmission and reception of information by means of electrical signals, in combination, a base member; a supporting member rotatably mounted on said base member and having a cylindrical face; an annular magnetic tape mounted on said cylindrical face of said supporting member and adapted to have electrical signals recorded thereon and reproduced therefrom; means for rotating said supporting member about its axis at a substantially constant speed; a first carrying arm fixedly mounted on said base member and having spaced end portions; a first recording head fixedly mounted on one end portion of said first carrying arm and arranged adjacent said magnetic tape for recording electrical signals thereon; a first reproducing head fixedly mounted on said one end portion of said first carrying arm and spaced from said first recording arm, said first reproducing head being arranged adjacent said magnetic tape for reproducing electrical signals therefrom; a first erasing head fixedly mounted on said one end portion of said first carrying arm between said first recording and reproducing heads for erasing recorded signals from said magnetic tape whenever desired; a second erasing head fixedly mounted on said other end portion of said first carrying arm for erasing recorded signals from said magnetic tape whenever desired; a second carrying arm pivotally mounted on said base member and having a free end portion; a second reproducing head fixedly mounted on said second carrying member and pivotable therewith, said second reproducing head being adapted to reproduce electrical signals from said magnetic tape whenever desired and being positioned between said first recording head and said second erasing head; a third carrying arm pivotally mounted on said base member and having a free end portion; a second reproducing means fixedly mounted on said third carrying member and pivotable therewith, said second reproducing head being adapted to reproduce electrical signals from said magnetic tape whenever desired and being positioned between said first recording head and said second erasing head; means for pivoting said second and third carrying arms in a predetermined manner to move said second recording and reproducing heads with respect to said magnetic tape at varying positive and negative velocities relative to the constant speed of said record carrier so as thereby to modulate the electrical signals occurring at said heads in said predetermined manner; and means for adjusting the relative positions between said second recording head and said second reproducing head.

12. In an apparatus for transmission and reception of coded information by means of electrical signals, in combination, a base member; an annular record carrier mounted on said base member and adapted to have electrical signals recorded thereon; a set of output means and a set of input means, each of said sets comprising in mutual association a recording head for recording electrical signals on said record carrier, an associated reproducing head for reproducing the electrical signals recorded on said record carrier by said associated recording head, and an associated erasing head for erasing recorded signals from said record carrier after said signals have been reproduced by said associated reproducing head; all of said heads being mounted on said base member within the area enclosed by said annular record carrier and adjacent said record carrier; means for causing a relative movement at a substantially constant velocity of said record carrier with respect to said heads; said set of output means including means for imparting to said reproducing head thereof predeterminedly varying velocities relative to said constant velocity, said associated recording and reproducing heads of said output means handling the same signal to be transmitted so as to transmit a coded information; said set of input means including means for imparting to said recording head thereof predeterminedly varying velocities relative to said constant velocity, said associated recording and reproducing heads of said input means handling the same received signal so as to decode the received coded information.

References Cited in the file of this patent

UNITED STATES PATENTS

| | | |
|---|---|---|
| 2,352,023 | Schuller | June 20, 1944 |
| 2,690,473 | Cooley | Sept. 28, 1954 |
| 2,773,120 | Masterson | Dec. 4, 1956 |